(12) United States Patent
Fukuda et al.

(10) Patent No.: US 10,325,695 B2
(45) Date of Patent: Jun. 18, 2019

(54) RECTANGULAR WIRE, AND METHOD OF PRODUCING THE SAME AND ELECTRICAL EQUIPMENT USING THE SAME

(71) Applicants: FURUKAWA ELECTRIC CO., LTD., Tokyo (JP); FURUKAWA MAGNET WIRE CO., LTD., Tokyo (JP)

(72) Inventors: Hideo Fukuda, Tokyo (JP); Dai Fujiwara, Tokyo (JP); Tsuneo Aoi, Tokyo (JP); Hiroshi Kaneiwa, Kariya (JP); Takefumi Kaji, Kariya (JP)

(73) Assignees: Furukawa Electric Co., Ltd., Tokyo (JP); Furukawa Magnet Wire Co., Ltd., Tokyo (JP)

( * ) Notice: Subject to any disclaimer, the term of this patent is extended or adjusted under 35 U.S.C. 154(b) by 0 days.

(21) Appl. No.: 15/061,544

(22) Filed: Mar. 4, 2016

(65) Prior Publication Data
US 2016/0189826 A1  Jun. 30, 2016

Related U.S. Application Data

(63) Continuation of application No. PCT/JP2014/072311, filed on Aug. 26, 2014.

(30) Foreign Application Priority Data

Sep. 6, 2013  (JP) .................................. 2013-185411

(51) Int. Cl.
*H01B 7/00* (2006.01)
*H01F 5/06* (2006.01)
(Continued)

(52) U.S. Cl.
CPC ............. *H01B 7/0009* (2013.01); *B32B 3/04* (2013.01); *B32B 3/14* (2013.01); *B32B 7/045* (2013.01);
(Continued)

(58) Field of Classification Search
CPC .. H01F 5/06; H01F 27/323; H01F 2027/2838; H01F 27/28; H01B 7/0823; H01B 7/02; H01B 7/0216; H02K 3/14
(Continued)

(56) References Cited

U.S. PATENT DOCUMENTS 3,252,117 A * 5/1966 Fischer ............... H01F 27/2871
174/34
3,723,797 A * 3/1973 Andersson ............... H01B 3/04
174/117 FF
(Continued)

FOREIGN PATENT DOCUMENTS

CA     1161616    *  2/1984
CN     1867631 A     11/2006
(Continued)

OTHER PUBLICATIONS

Original Japanese version and English Machine Translation of Takahashi (JP2005-203334) provided with Office Action.*
(Continued)

*Primary Examiner* — Roshn K Varghese
(74) *Attorney, Agent, or Firm* — Birch, Stewart, Kolasch & Birch, LLP (57) ABSTRACT

A rectangular wire having: a multilayer conductor member constructed by stacking, in a thickness direction, a rectangular metallic conductor that has a layer of a first thermoplastic resin formed on the outer periphery thereof, the first thermoplastic resin being a non-crystalline resin having no melting point or a crystalline resin having an amide bond; and a layer of a second thermoplastic resin having a melting point of 300° C. or more on the outer periphery of the multilayer conductor member.

5 Claims, 4 Drawing Sheets

(51) Int. Cl.
| | |
|---|---|
| *H02K 3/30* | (2006.01) |
| *H01B 13/06* | (2006.01) |
| *B32B 7/04* | (2006.01) |
| *B32B 27/06* | (2006.01) |
| *B32B 27/08* | (2006.01) |
| *B32B 27/28* | (2006.01) |
| *B32B 27/34* | (2006.01) |
| *B32B 3/14* | (2006.01) |
| *H01B 7/02* | (2006.01) |
| *H01B 13/00* | (2006.01) |
| *H02K 3/04* | (2006.01) |
| *B32B 15/04* | (2006.01) |
| *B32B 15/08* | (2006.01) |
| *B32B 15/088* | (2006.01) |
| *B32B 15/20* | (2006.01) |
| *B32B 3/04* | (2006.01) |
| *H01B 3/30* | (2006.01) |

(52) U.S. Cl.
CPC ............. *B32B 15/04* (2013.01); *B32B 15/08* (2013.01); *B32B 15/088* (2013.01); *B32B 15/20* (2013.01); *B32B 27/06* (2013.01); *B32B 27/08* (2013.01); *B32B 27/281* (2013.01); *B32B 27/285* (2013.01); *B32B 27/286* (2013.01); *B32B 27/288* (2013.01); *B32B 27/34* (2013.01); *H01B 7/0216* (2013.01); *H01B 13/0036* (2013.01); *H01B 13/065* (2013.01); *H01F 5/06* (2013.01); *H02K 3/04* (2013.01); *H02K 3/30* (2013.01); *B32B 2307/202* (2013.01); *B32B 2307/30* (2013.01); *B32B 2307/702* (2013.01); *B32B 2457/00* (2013.01); *H01B 3/308* (2013.01)

(58) Field of Classification Search
USPC ................. 174/117 R, 119 R; 310/45, 201
See application file for complete search history.

(56) References Cited

U.S. PATENT DOCUMENTS

| | | | | |
|---|---|---|---|---|
| 4,216,263 A | * | 8/1980 | Otis | ......... H01B 3/305 174/110 N |
| 4,321,426 A | * | 3/1982 | Schaeffer | .............. H01F 27/323 174/34 |
| 4,552,990 A | * | 11/1985 | Persson | ............... H01F 27/2823 174/117 FF |
| 6,710,692 B2 | * | 3/2004 | Kato | ....................... H01F 17/04 336/200 |
| 2008/0128154 A1 | | 6/2008 | Faust et al. | |
| 2008/0231136 A1 | * | 9/2008 | Obata | .................... H02K 3/345 310/179 |
| 2012/0279754 A1 | * | 11/2012 | Rabbia | ..................... H02K 3/14 174/117 R |
| 2013/0037304 A1 | | 2/2013 | Ikeda et al. | |
| 2013/0037305 A1 | | 2/2013 | Fournier et al. | |

FOREIGN PATENT DOCUMENTS

| | | | | |
|---|---|---|---|---|
| CN | 101073127 A | | 11/2007 | |
| CN | 101707064 A | | 5/2010 | |
| CN | 202563917 U | | 11/2012 | |
| JP | 59-29307 A | | 2/1984 | |
| JP | 02078108 A | * | 3/1990 | |
| JP | 2005203334 A | * | 7/2005 | |
| JP | 2007-18732 A | | 1/2007 | |
| JP | 2009-245652 A | | 10/2009 | |
| JP | 2009-245666 A | | 10/2009 | |
| JP | 2013-41700 A | | 2/2013 | |
| WO | WO 9814964 A1 | * | 4/1998 | ......... H01F 27/2823 |
| WO | WO 2008/093645 A1 | | 8/2008 | |

OTHER PUBLICATIONS

Original German version and English Machine Translation of Perger (WO 98/14964) provided with Office Action.*
Original English Janssen (CA 1161616) provided with Office Action.*
International Search Report for PCT/JP2014/072311 dated Dec. 2, 2014.
Chinese Office Action and Search Report, dated Dec. 1, 2016, for Chinese Application No. 201480048536.9, together with an English translation thereof.
"Polyether Ether Ketone," Wikipedia, retrieved from URL:https://en.wikipedia.org/wiki/Polyether_ether_ketone, Apr. 4, 2017, pp. 1-4.
Extended European Search Report for corresponding European Application No. 14842190, dated Apr. 19, 2017.
Chinese Office Action dated Jul. 13, 2017 for Chinese Application No. 201480048536.9, together with an English translation thereof.

* cited by examiner

RECTANGULAR WIRE, AND METHOD OF PRODUCING THE SAME AND ELECTRICAL EQUIPMENT USING THE SAME

CROSS-REFERENCE TO RELATED APPLICATIONS

This application is a Continuation of PCT International Application No. PCT/JP2014/072311 filed on Aug. 26, 2014, which claims priority under 35 U.S.C. § 119 (a) to Japanese Patent Application No. 2013-185411 filed in Japan on Sep. 6, 2013. Each of the above applications is hereby expressly incorporated by reference, in its entirety, into the present application.

TECHNICAL FIELD

The present invention relates to a rectangular wire, which is composed by stacking a plurality of rectangular metallic bodies, and which is mainly intended for a high-frequency application, and further the present invention relates to a method of producing the same and electrical equipment using the same.

BACKGROUND ART

In general, the high-frequency rectangular wire is used for coils and the like of the AC motor and the high-frequency electrical equipment. This is also applied to motors for a high-speed railroad vehicle, in addition to motors for a hybrid vehicle (HV) and an electric vehicle (EV). Conventional rectangular wires are composed by stacking rectangular metallic bodies each having a rectangular shape of a cross-section and an insulative enamel film or oxide film formed on the outer periphery of the rectangular metallic body (for example, see Patent Literature 1 or 2).

CITATION LIST

Patent Literatures

Patent Literature 1: JP-A-S59 (1984)-029307 ("JP-A" means unexamined published Japanese patent application)
Patent Literature 2: JP-A-2009-245666

SUMMARY OF INVENTION

Technical Problem

In the conventional high-frequency rectangular wires, which are composed by stacking a plurality of rectangular metallic bodies having an insulative enamel film formed on the outer periphery thereof, high-frequency property is developed by stacking the rectangular metallic conductors. However, the enamel film remains as soot at the welding step in assembling of a motor. As a result, the soot made it difficult to rigidly weld.

The present invention has been made to solve the above problem and is to provide a rectangular wire which allows a rigid weld of the rectangular wire at the welding step in assembling of the motor, while satisfying high-frequency property, and to provide a method of producing the same and an electrical equipment using the same.

Solution to Problem

The rectangular wire of the present invention has a multilayer conductor member and a layer of a thermoplastic resin having a melting point of 300° C. or more on the outer periphery thereof, the multilayer conductor member being constructed by forming a layer of a non-crystalline resin having no melting point or a crystalline resin having an amide bond on the outer periphery of a rectangular metallic body as a layer to be stacked, and by stacking the resin-coated rectangular metallic body in the form of multi-layers.

That is, the present invention provides the following means:

(1) A rectangular wire having:
a multilayer conductor member constructed by stacking, in a thickness direction, a rectangular metallic conductor that has a layer of a first thermoplastic resin formed on the outer periphery thereof, the first thermoplastic resin being a non-crystalline resin having no melting point or a crystalline resin having an amide bond; and
a layer of a second thermoplastic resin having a melting point of 300° C. or more on the outer periphery of the multilayer conductor member.

(2) A rectangular wire having:
a multilayer conductor member constructed by stacking a rectangular basic wire obtained by forming a layer of a first thermoplastic resin only on one side of a rectangular metallic conductor, on the side of the formed layer of the first thermoplastic resin, the first thermoplastic resin being a non-crystalline resin having no melting point or a crystalline resin having an amide bond; and
a layer of a second thermoplastic resin having a melting point of 300° C. or more on the outer periphery of the multilayer conductor member.

(3) The rectangular wire described in the item (1) or (2), wherein the first thermoplastic resin is a resin selected from the group consisting of a polyetherimide, a polyphenylsulfone, a polyethersulfone, a polyamide 66, a polyamide 46, and a polyamide 6.

(4) The rectangular wire described in any one of the items (1) to (3), wherein the second thermoplastic resin is a resin selected from the group consisting of a polyaryletherketone, a modified poletheretherketone, and a thermoplastic polyimide.

(5) The rectangular wire described in any one of the items (1) to (4), wherein the total number of stacking the rectangular metallic conductors in the thickness direction is 2 or more and 6 or less.

(6) The rectangular wire described in any one of the items (1) to (5), wherein a thickness of a baked coat layer formed by bake-coating the first thermoplastic resin is 0.5 µm or more and 50 µm or less.

(7) A method of producing a rectangular wire comprising:
a step of forming a multilayer conductor member by stacking, in a thickness direction, a rectangular metallic conductor having formed by bake-coating a layer of a first thermoplastic resin on the outer periphery thereof, the first thermoplastic resin being a non-crystalline resin having no melting point or a crystalline resin having an amide bond; and
a step of coating a layer of a second thermoplastic resin having a melting point of 300° C. or more on the outer periphery of the multilayer conductor member.

(8) An electrical equipment comprising a rectangular wire having:
a multilayer conductor member constructed by stacking, in a thickness direction, a rectangular metallic conductor having a layer of a first thermoplastic resin formed on the outer periphery thereof, the first thermoplastic resin being a non-crystalline resin having no melting point or a crystalline resin having an amide bond; and a layer of a second thermoplastic resin having a melting point of 300° C. or more on the outer periphery of the multilayer conductor member.

Advantageous Effects of Invention

According to the rectangular wire of the present invention, an inhibitory effect on the high-frequency loss can be achieved, by selecting a thermoplastic resin provided on the outer periphery of the rectangular metallic conductor to be stacked. Together with this advantage, ease of welding can be combined, without generating soot upon welding.

The method of producing a rectangular wire according to the present invention allows provision of a method of producing a rectangular wire which exhibits an excellent high-frequency property and ease of welding.

The electrical equipment of the present invention allows provision of an electrical equipment which exhibits an excellent high-frequency property together with a high reliance of wire jointing because the rectangular wire of the present invention has an excellent welding property.

Other, and further features and advantages of the invention will appear more fully from the following description, appropriately referring to the accompanying drawings.

BRIEF DESCRIPTION OF DRAWINGS

FIGS. 2(a) and 2(b) each illustrate a cross-section view showing another of preferable embodiments related to the rectangular wire of the present invention. In the figures.

FIGS. 3(a), 3(b), 3(c), and 3(d) each are a figure showing evaluation of the welding property. In the figures.

FIGS. 4(a), 4(b), 4(c), and 4(d) each are a figure showing evaluation of the molding property. In the figures.

Note, however, that indication of the hatching showing the cross-section was omitted.

MODE FOR CARRYING OUT THE INVENTION

With regard to the rectangular wire of the present invention, one of preferable embodiments is described with reference to FIG. 1.

Figure 1:
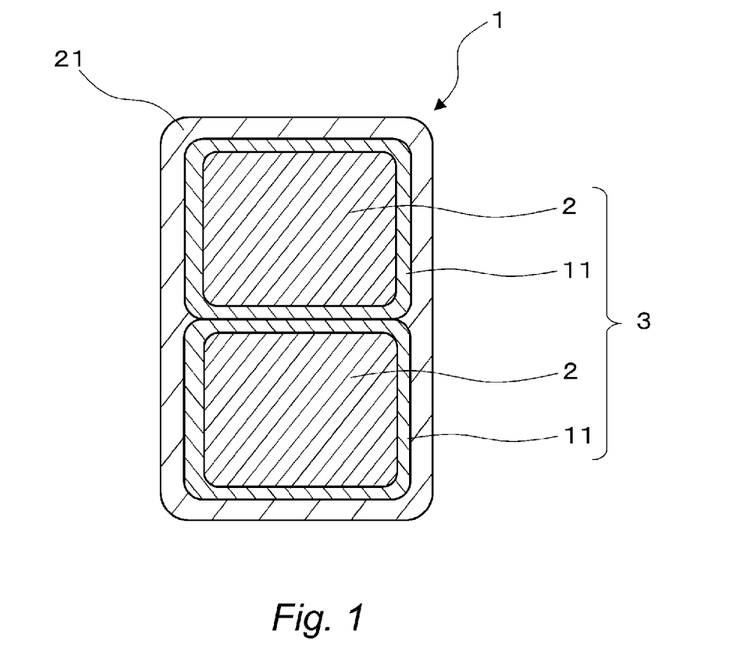
FIG. 1 is a cross-section view showing one of preferable embodiments related to the rectangular wire of the present invention.

As shown in FIG. 1, the rectangular wire 1 has a multi-layer conductor member 3 constructed by stacking, in the thickness direction, a rectangular metallic conductor (also referred to as a metallic conductor) 2 having a layer 11 of a first thermoplastic resin formed on the outer periphery thereof. Further, the rectangular wire 1 has a layer 21 of a second thermoplastic resin on the outer periphery of the multilayer conductor member 3. The layer 11 of the first thermoplastic resin is composed of a non-crystalline resin having no melting point or a crystalline resin having an amide bond. The layer 21 of the second thermoplastic resin is composed of a thermoplastic resin having a melting point of 300° C. or more. The rectangular wire 1 having such a construction allows a combination of an inhibitory effect on the high-frequency loss and ease of welding, without generating soot upon welding.

(Rectangular Metallic Conductor)

As for the rectangular metallic conductor 2 in the rectangular wire 1, those that have been used as a conventional rectangular wire may be used.

Examples of the rectangular metallic conductor 2 include a conductor of, preferably, a low-oxygen copper having an oxygen content of 30 ppm or less, or an oxygen-free copper. If the oxygen content of the rectangular metallic conductor 2 is 30 ppm or less, when the rectangular metallic conductor 2 is fused by heat for welding, generation of voids due to oxygen contained in the welded place is suppressed. Further, together with prevention of the electric resistance in the welded place from deterioration, mechanical strength at the welded place can be maintained.

(Layer on the Outer Periphery of Metallic Conductor)

The layer to be formed on the outer periphery of the metallic conductor 2 in the rectangular wire 1 is formed by the layer 11 of a first thermoplastic resin of a non-crystalline resin having no melting point or a crystalline resin having an amide bond. Examples of the first thermoplastic resin include: non-crystalline, polyetherimide (PEI), polyphenyl-sulfone (PPSU), polyethersulfone (PES), and the like; and crystalline, polyamide 66 (PA66), polyamide 46 (PA46), polyamide 6 (PA6), and the like.

As the layer 11 of the first thermoplastic resin to be formed on the outer periphery of the metallic conductor 2, the thickness thereof may be 60 μm or less, in order to decrease the number of passing the layer 11 through a baking furnace, thereby for preventing a bake-coated layer from deterioration as much as possible, and developing the high-frequency property. Further, in consideration of obtaining molding property of the multilayer conductor member 3, the thickness of the layer 11 of the first thermoplastic resin is preferably 50 μm or less, more preferably 25 μm or less, and still more preferably 15 μm or less. On the other hand, in order to develop the high-frequency property and also to obtain insulation property between metallic conductors, there is no particular limitation, as long as the thickness thereof may be within a degree of not causing pinholes. Specifically, the thickness of the layer 11 of the first thermoplastic resin is preferably 0.5 μm or more, more preferably 2 μm or more, and still more preferably 3 μm or more.

The baked layer of the first thermoplastic resin can be formed by bake-coating, preferably in a plurality of times, a resin varnish containing the first thermoplastic resin on the metallic conductor 2. The method of coating the resin varnish may be in a usual manner. Examples of the coating method include a method of employing a die for a varnish coating, which has been manufactured so as to be similar to the shape of the metallic conductor 2, and a method of employing a die that is called "universal die", which is formed in a curb shape when the cross-section shape of the metallic conductor 2 is quadrangular. The metallic conductor 2 having the varnish of these resins coated thereon is baked by a baking furnace in a usual manner. Specific baking conditions depend on the shape of a furnace to be used. For example, if the furnace is an about 5 m-sized vertical furnace by natural convection, the baking can be achieved by setting the passing time period to 10 to 90 sec at the temperature of 400 to 500° C.

Figures 2A, 2B:
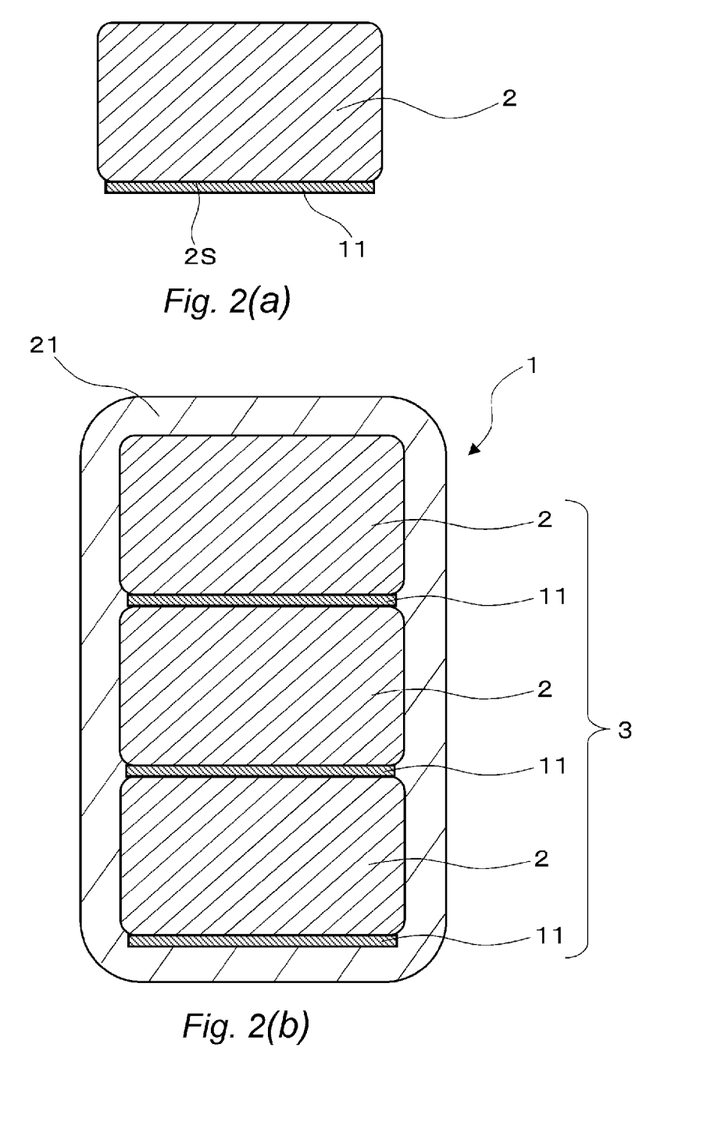
FIG. 2(a) is a cross-section view showing a cross-section of the metallic conductor on which a layer of a first thermoplastic resin has been formed by coating.
FIG. 2(b) is a cross-section view showing a cross-section of the rectangular wire in which a layer of a second thermoplastic resin has been formed on the multilayer conductor member.

Further, in the step of coating and baking the resin varnish containing the first thermoplastic resin on the metallic conductor 2, the layer 11 of the first thermoplastic resin may be formed by bake-coating of the resin varnish only on one side 2S of four sides existing on the outer periphery of the metallic conductor 2, as shown in FIG. 2(*a*). In this case, a desired constitution can be obtained by masking the sides other than the side necessary for coating and by coating the varnish only on the one necessary side 2S. Further, as shown in FIG. 2(*b*), the multilayer conductor member 3 is formed by stacking rectangular basic wires each of which is composed of the metallic conductor 2 having the layer 11 of the first thermoplastic resin formed thereon, in the form of multilayer, through the layer 11 of the first thermoplastic resin. In the drawing, as an example, the multilayer conductor member 3 in which 3 layers are stacked is shown. Further, in the same manner as described above, the layer 21 of the second thermoplastic resin is formed on the outer periphery of the multilayer conductor member 3, whereby the rectangular wire 1 is constituted.

It is noted that the number of layers to stack the metallic conductor 2 is preferably 2 or more and 6 or less. A decrease in the high-frequency loss can be fully appreciated even in the case where the number of layers to stack is 2. As the number of the layers increases, the loss is more decreased. In the case where the number of layers to stack is 7 or more, a decrease in the high-frequency loss can be also appreciated. However, because the proportion of an insulation member increases and the filling rate of the metallic conductor decreases, it is thought that a sufficient decrease of the loss cannot be appreciated. Further, it is difficult to stack 7 or more layers without misalignment. In view of the above, it can be said to be realistic that the number of layers to stack is up to 6.

Further, with regard to the direction to stack, whether the layers are stacked in any one of the direction of width or thickness does not make any difference, provided that the longer side of the rectangular metallic conductor 2 is defined as a width, and the shorter side thereof is defined as a thickness. Preferably, the rectangular metallic conductors 2 are brought into contact with one another through their longer sides and are stacked in the thickness direction.

(Layer on Outer Periphery of Multilayer Conductor Member)

As the layer on the outer periphery of the multilayer conductor member 3 in the rectangular wire 1, at least one layer exhibiting high strength of adhesion to the multilayer conductor member 3 is provided on the outer periphery of the multilayer conductor member 3. The layer number may be one or may be more than one.

The layer on the outer periphery of the multilayer conductor member 3 is the layer 21 of the second thermoplastic resin and the second thermoplastic resin is an extrusion-moldable thermoplastic resin. The melting point of this thermoplastic resin is preferably 300° C. or more, and more preferably 330° C. or more, in terms of excellent adhesion strength between the multilayer conductor member and the layer on the outer periphery of the multilayer conductor member and excellent solvent resistance, in addition to anti-heat aging property. The upper limit of the melting point of the second thermoplastic resin is preferably 450° C. or less. The melting point of the second thermoplastic resin can be measured by differential scanning calorimetry (DSC).

This second thermoplastic resin preferably has relative permittivity of 4.5 or less, and more preferably 4.0 or less, in that a partial discharge inception voltage can be more increased. The relative permittivity can be measured by a commercially available permittivity measurement device. The measuring temperature and frequency are changed as needed. In the present specification, the values measured at 25° C. and 50 Hz are adopted, unless otherwise specified.

The layer 21 of the second thermoplastic resin exhibits high strength of adhesion to the multilayer conductor member 3, and at least one or more than one layer is provided on the outer periphery of the multilayer conductor member 3.

Examples of the extrusion-moldable thermoplastic resin include polyetheretherketone (PEEK), a modified polyetheretherketone (modified-PEEK), a thermoplastic polyimide (PI), a polyamide having an aromatic ring (referred to as an aromatic polyamide), polyketone (PK) and the like.

As the second thermoplastic resin, use may be made of a polyaryletherketone (PAEK), which is a thermoplastic resin containing an aromatic ring, an ether bond and a ketone bond and which is represented by polyetherketone (PEK) and polyetheretherketone. Alternatively, use may be made of a modified polyetheretherketone in which other thermoplastic resin(s) is (are) mixed in polyetheretherketone. Alternatively, use may be made of at least one thermoplastic resin selected from the group consisting of thermoplastic polyimides (TPI). Among those thermoplastic resins, use may be made of those having a melting point of 300° C. or more and 450° C. or less and preferably having relative permittivity of 4.5 or less. As the thermoplastic resin, one kind may be used alone, or more than one kind may be used. In the case where at least two kinds are mixed and at least two kinds of melting points exist, if the at least two kinds of melting points include a melting point of 300° C. or more, the mixture may be suitable. Further, the modified polyetheretherketone is, for example, a mixture in which polyphenylsulfone is added to polyetheretherketone, the mixing rate of polyphenylsulfone being lower than polyetheretherketone.

It is preferred in achieving advantageous effects of the present invention that the thickness of the layer 21 of the second thermoplastic resin which is an extrusion-coated resin layer is 40 μm or more and 200 μm or less. If the thickness of the layer 21 of the second thermoplastic resin which forms a layer on the outer periphery of the multilayer conductor member 3 is too thick, the layer 21 of the second thermoplastic resin becomes less effective in flexibility required for the rectangular wire 1, because the layer 21 of the second thermoplastic resin itself has stiffness. On the other hand, from the viewpoint that insulation failure can be prevented, the thickness of the layer 21 of the second thermoplastic resin is preferably 40 μm or more and more preferably 50 μm or more.

The extrusion temperature conditions in extrusion molding of the second thermoplastic resin are set adequately depending on the thermoplastic resin to be used. Stated as an example of a preferable extrusion temperature, specifically, in order to make the fusing temperature appropriate for extrusion-coating, the extrusion temperature is set to a temperature higher than the melting point of the thermoplastic resin by about 40° C. to 60° C. In this way, the layer 21 of the second thermoplastic resin which is an extrusion-coated resin layer is formed by temperature-setting extrusion molding. In this case, in forming the covering resin layer in the production process, it is not necessary to pass the covering resin layer into a baking furnace, so that there is an advantage that the thickness of the insulation layer, namely the layer 21 of the second thermoplastic resin can be thickened, without growing the thickness of the oxidized coat layer of the metallic conductor 2.

In the rectangular wire 1 according to this preferable embodiment, the multilayer conductor member 3 and the layer 21 of the second thermoplastic resin on the outer periphery thereof adhere to one another at a high strength of adhesion. The adhesion strength between the multilayer conductor member 3 and the layer 21 of the second thermoplastic resin on the outer periphery thereof is measured, for example, in the same manner as "5.2 Stretch test" of "JIS C 3216-3 Winding wires-Test methods-Part 3 Mechanical properties", and whether a float in the specimen after stretching is present or absent can be examined with the naked eye.

Further, the rectangular wire 1 according to this preferable embodiment exhibits excellent anti-heat aging property. The anti-heat aging property serves as an indicator for retention of reliance that insulation performance is not decreased over a long period of time even in the use under high temperature circumstances. For example, a wound specimen is used, in accordance with "5-1 Winding test" of "JIS C 3216-3 Winding wires-Test methods-Part 3 Mechanical properties". After still standing of it in a high-temperature tank heated at 190° C. for 1,000 hours, whether the crack generated in the layer 21 of the second thermoplastic resin (the layer on the outer periphery of the multilayer conductor member 3) is present or absent can be examined with the naked eye. The rectangular wire 1 according to this preferable embodiment allows maintenance of the anti-heat aging property over a much longer period of time, for example, even after still standing for 1,500 hours, even in the use under high temperature circumstances.

In this embodiment, when the crack of the layer 21 of the second thermoplastic resin is indeterminable and there is no abnormality, the anti-heat aging property can be evaluated as being excellent. In the rectangular wire 1 according to this preferable embodiment, the crack cannot be seen in the layer 21 of the second thermoplastic resin after 1,000 hours as a matter of course, even after 1,500 hours. As a result, the rectangular wire 1 exhibits an excellent anti-heat aging property and reliance can be held over a much longer period of time even in the use under high temperature circumstances.

With regard to resistance to solvent, a wound specimen is used, in accordance with "5-1 Winding test" of "JIS C 3216-3 Winding wires-Test methods-Part 3 Mechanical properties". The test can be carried out by checking with the naked eye the surface of the layer 21 of the second thermoplastic resin, after immersion of the wound specimen in a solvent for 10 seconds. In this embodiment, the test is carried out by using 3 kinds of solvents of acetone, xylene and styrene and 2 levels of temperature of normal temperature and 150° C. (just after heating the solvent at 150° C. for 30 minutes, the specimen, while it is hot, is immersed in the solvent). Then, when there is no abnormality in the surface of the layer 21 of the second thermoplastic resin, the resistance to solvent is evaluated as being very excellent. In the rectangular wire 1 according to this preferable embodiment, no abnormality is found in the surface of the layer 21 of the second thermoplastic resin, whatever the solvent is any of acetone, xylene and styrene, and the temperature is either of normal temperature or 150° C.

The rectangular wire 1 of the present invention may have a configuration in which the multilayer conductor members 3 are aligned in parallel to one another in multi-lines and are covered with the layer 21 of the second thermoplastic resin. Even by such a multi-line configuration, the same performance as the single-line configuration can be obtained.

The rectangular wire 1 of the present invention as described above is preferably applied to a coil which constitutes motors of a hybrid vehicle or an electric vehicle, as an example of the electrical equipment. For example, the rectangular wire 1 can be used for a winding wire which forms a stator coil of the rotating electrical machine (motor) as described in JP-A-2007-259555. The constitution in which such a rectangular wire as the present invention is stacked has an advantage that a current loss is minor even in the high-frequency region.

EXAMPLES

The present invention will be described in more detail based on examples given below, but the invention is not meant to be limited by these.

Example 1

A rectangular metallic conductor 2 (see FIG. 1) was provided, which was made of copper of 0.85×3.2 mm (thickness×width) having chamfered four-cornered radius r=0.3 mm, and which had oxygen content of 15 ppm. In formation of a layer 11 (see FIG. 1) of a first thermoplastic resin to become an outer peripheral layer of the metallic conductor 2 made of copper, a polyetherimide (PEI) varnish was coated on the metallic conductor 2, using a die having a shape similar to the metallic conductor 2. As PEI, use was made of trade name: ULTEM 1010, manufactured by SABIC Innovative Plastics Japan Co., Ltd. Then, the thus-coated metallic conductor 2 was got through an 8 m-length baking furnace set to 450° C. at the baking speed so that the baking time became 15 seconds. The polyetherimide varnish was prepared by dissolving the polyetherimide in N-methyl-2-pyrrolidone (NMP). At this one baking step, a polyetherimide layer with thickness 0.5 μm was formed. By adjusting a varnish concentration, the polyetherimide layer with thickness 0.5 μm was formed, to obtain the metallic conductor 2 with the 0.5 μm-thick coating layer.

The thus-obtained metallic conductors 2 were stacked so as to be two layers in the thickness direction, thereby for obtaining a multilayer conductor member 3 (see FIG. 1), and then a layer 21 of a second thermoplastic resin (see FIG. 1) was provided on the outer periphery thereof by extrusion molding. As a screw of the extruder, use was made of the screw specified by: 30 mm full flight; L/D=20; and compression ratio 3. The extrusion was carried out using a polyetheretherketome (PEEK) as the second thermoplastic resin, in accordance with the temperature conditions for extrusion, as shown in Table 1. As the PEEK, use was made of trade name: KITA SPIRE KT-820, manufactured by Solvay Specialty Polymers, relative permittivity 3.1, melting point 343° C. "C1, C2, and C3" in Table 1 indicate a cylinder temperature in the extruder, and respectively indicate 3-zone temperatures in the order from the resin-casting section. "H" indicates a temperature of the head section, and "D" indicates a temperature of the die section. After extrusion-coating for the multilayer conductor member 3 with the polyetheretherketone using an extruding die, the multilayer conductor member 3 was allowed to still stand for 10 seconds and then was cooled with water. Then, the layer 21 of the second thermoplastic resin was formed on the outer periphery of the multilayer conductor member 3 so as to be a thickness of 115 μm, thereby for obtaining the rectangular wire 1 (see FIG. 1).

Examples 2, 4, 5, 6

The thickness of each of the layer 11 of the first thermoplastic resin (see FIG. 1) and the layer 21 of the second thermoplastic resin (see FIG. 1) was changed to thicknesses shown in Table 2. The rectangular wire 1 (see FIG. 1) was obtained in the same manner as Example 1, except that the thickness was changed.

Example 3

A rectangular metallic conductor, which was made of copper of 0.141×3.2 mm (thickness×width) having chamfered four-cornered radius r=0.3 mm, and which had oxygen content of 15 ppm, is provided. Then, the rectangular wire 1 was obtained in the same manner as Example 1, except that the thickness of each of the layer of the first thermoplastic resin and the layer of the second thermoplastic resin was changed to thicknesses shown in Table 2 and that the number of stacked layers was changed to 6.

Examples 7, 8

In the layer 11 (see FIG. 1) of the first thermoplastic resin, a polyethersulfone (PES, manufactured by Sumitomo Chemical Co., Ltd., trade name: SUMIKA EXCEL 4000G, relative permittivity 3.4) was used in place of the polyetherimide. The thickness of each of the layer 11 of the first thermoplastic resin and the layer 21 (see FIG. 1) of the second thermoplastic resin was set to thicknesses shown in Table 2. The rectangular wires 1 (see FIG. 1) were obtained in the same manner as Example 1, except for those.

Example 9

In the layer 11 of the first thermoplastic resin, a polyphenylsulfone (PPSU, manufactured by Solvay Specialty Polymers Japan Co., Ltd., trade name: RADEL R 5800, relative permittivity 3.3) was used in place of the polyetherimide. The thickness of each of the layer 11 of the first thermoplastic resin and the layer 21 of the second thermoplastic resin was set to thicknesses shown in Table 2. The rectangular wire 1 (see FIG. 1) was obtained in the same manner as Example 1, except for those.

Examples 10, 11, 13, 14, 15, 18, 19

In the layer 11 of the first thermoplastic resin, a polyamide 66 (PA66, manufactured by Asahi Kasei Corporation, trade name: LEONA 1402S, relative permittivity 3.8) was used in place of the polyetherimide. The thickness of each of the layer 11 of the first thermoplastic resin and the layer 21 of the second thermoplastic resin was set to thicknesses shown in Table 2. The rectangular wires 1 (see FIG. 1) were obtained in the same manner as Example 1, except for those.

Examples 12, 20, 21

In the layer 11 of the first thermoplastic resin, a polyimide 66 (PA66, manufactured by Asahi Kasei Corporation, trade name: LEONA 1402S, relative permittivity 3.8) was used in place of the polyetherimide. The thickness of each of the layer 11 of the first thermoplastic resin and the layer 21 of the second thermoplastic resin was set to thicknesses shown in Table 2. The rectangular wires 1 (see FIG. 1) were obtained in the same manner as Example 3, except for those.

Example 16

In the layer 21 (see FIG. 1) of the second thermoplastic resin, a modified polyetheretherketone (modified-PEEK) was used in place of the polyetheretherketone. As the modified polyetheretherketone, use was made of trade name: AVASPIRE AV-650, manufactured by Solvay Specialty Polymers Japan Co., Ltd., relative permittivity 3.1, melting point 340° C. The thickness of each of the layer 11 of the first thermoplastic resin and the layer 21 of the second thermoplastic resin was set to thicknesses shown in Table 2. The rectangular wire 1 (see FIG. 1) was obtained in the same manner as Example 1, except for those. On this occasion, the extrusion-temperature conditions at the extrusion molding of the layer 21 of the second thermoplastic resin were set to those given in Table 1.

Example 17

In the layer 21 of the second thermoplastic resin, a modified polyetheretherketone (modified-PEEK) was used in place of the polyetheretherketone. As the modified polyetheretherketone, use was made of trade name: AVASPIRE AV-650, manufactured by Solvay Specialty Polymers Japan Co., Ltd., relative permittivity 3.1, melting point 340° C. The thickness of each of the layer 11 of the first thermoplastic resin and the layer 21 of the second thermoplastic resin was set to thicknesses shown in Table 2. The rectangular wire 1 was obtained in the same manner as Example 3, except for those. On this occasion, the extrusion-temperature conditions at the extrusion molding of the layer 21 of the second thermoplastic resin were set to those given in Table 1, in the same manner as in Example 14.

Examples 22, 23

Use was made of the same rectangular metallic conductor as in Example 1. In the layer 11 of the first thermoplastic resin, the same polyamide 66 was used as in Example 10, and the thickness of the layer 11 of the first thermoplastic resin was set as shown in Table 2. Further, the metallic conductor coated with the layer 11 of the first thermoplastic resin was stacked in two layers. The two-layered metallic conductors were arranged by a two-line configuration, thus for preparing a multilayer conductor member. Further, the thickness of the layer 21 of the second thermoplastic resin was set as shown in Table 2. The rectangular wire 1 was obtained in the same manner as Example 10, except for those as above.

Example 24

Only on one side 2S in the width direction of the metallic conductor 2, the layer 11 (see FIG. 2) of the first thermoplastic resin was coated and baked. Except for the above, a rectangular wire 1 was obtained in the same manner as Example 13.

Example 25

Only on one side 2S in the width direction of the metallic conductor 2, the layer 11 (see FIG. 2) of the first thermoplastic resin was coated and baked. Except for the above, a rectangular wire 1 was obtained in the same manner as Example 20.

Comparative Examples 1 to 5

In Comparative Example 1, a polyamideimide (PAI, manufactured by Hitachi Chemical Co., Ltd., trade name: HI406) was used in the layer 11 (see FIG. 1) of the first thermoplastic resin. The thickness of each of the layer 11 of the first thermoplastic resin and the layer 21 (see FIG. 1) of the second thermoplastic resin was set to thicknesses shown in Table 2. The rectangular wire 1 was obtained in the same manner as Example 1, except for those.

In Comparative Example 2, a polyimide (PI, manufactured by Unitika Ltd., trade name: U IMIDE) was used in the layer 11 (see FIG. 1) of the first thermoplastic resin. The thickness of each of the layer 11 of the first thermoplastic resin and the layer 21 (see FIG. 1) of the second thermoplastic resin was set to thicknesses shown in Table 2. The rectangular wire 1 was obtained in the same manner as Example 1, except for those.

In Comparative Example 3, the polyetheretherketone was extrusion-coated directly on the outer periphery of the multi-layered metallic conductor, without providing any layer on the outer periphery of the metallic conductor. The thickness of the layer 21 of the second thermoplastic resin was set to thickness shown in Table 2. The rectangular wire 1 was obtained in the same manner as Example 1, except for those.

In Comparative Example 4, the number of layers to be sacked was made to 7. The thickness of each of the layer 11 (see FIG. 1) of the first thermoplastic resin and the layer 21 (see FIG. 1) of the second thermoplastic resin was set to thicknesses shown in Table 2. The rectangular wire 1 was obtained in the same manner as Example 9, except for those.

In Comparative Example 5, the thickness of the layer 11 (see FIG. 1) of the first thermoplastic resin was set to 55 μm and the thickness of the layer 21 (see FIG. 1) of the second thermoplastic resin was set to thickness shown in Table 2. The rectangular wire 1 (see FIG. 1) was obtained in the same manner as Example 1, except for those. At this one baking step, the layer 11 of the first thermoplastic resin with thickness 5 μm was formed; and by repeating this step 11 times, the later with the thickness of 55 μm was formed.

TABLE 1

| The 2nd theromoplastic resin to coat the multilayer conductor member by extrusion-molding | | PEEK | modified-PEEK |
| --- | --- | --- | --- |
| Temperature conditions for extruding | C1 (° C.) | 300 | 300 |
| | C2 (° C.) | 380 | 380 |
| | C3 (° C.) | 380 | 380 |
| | H (° C.) | 390 | 390 |
| | D (° C.) | 400 | 400 |

The following evaluations of the rectangular wires of Examples 1 to 23 and Comparative Examples 1 to 5 produced in these ways were conducted. The results of these evaluations are shown in Table 2.

(Welding Property)

Figures 3A, 3B, 3C, 3D:
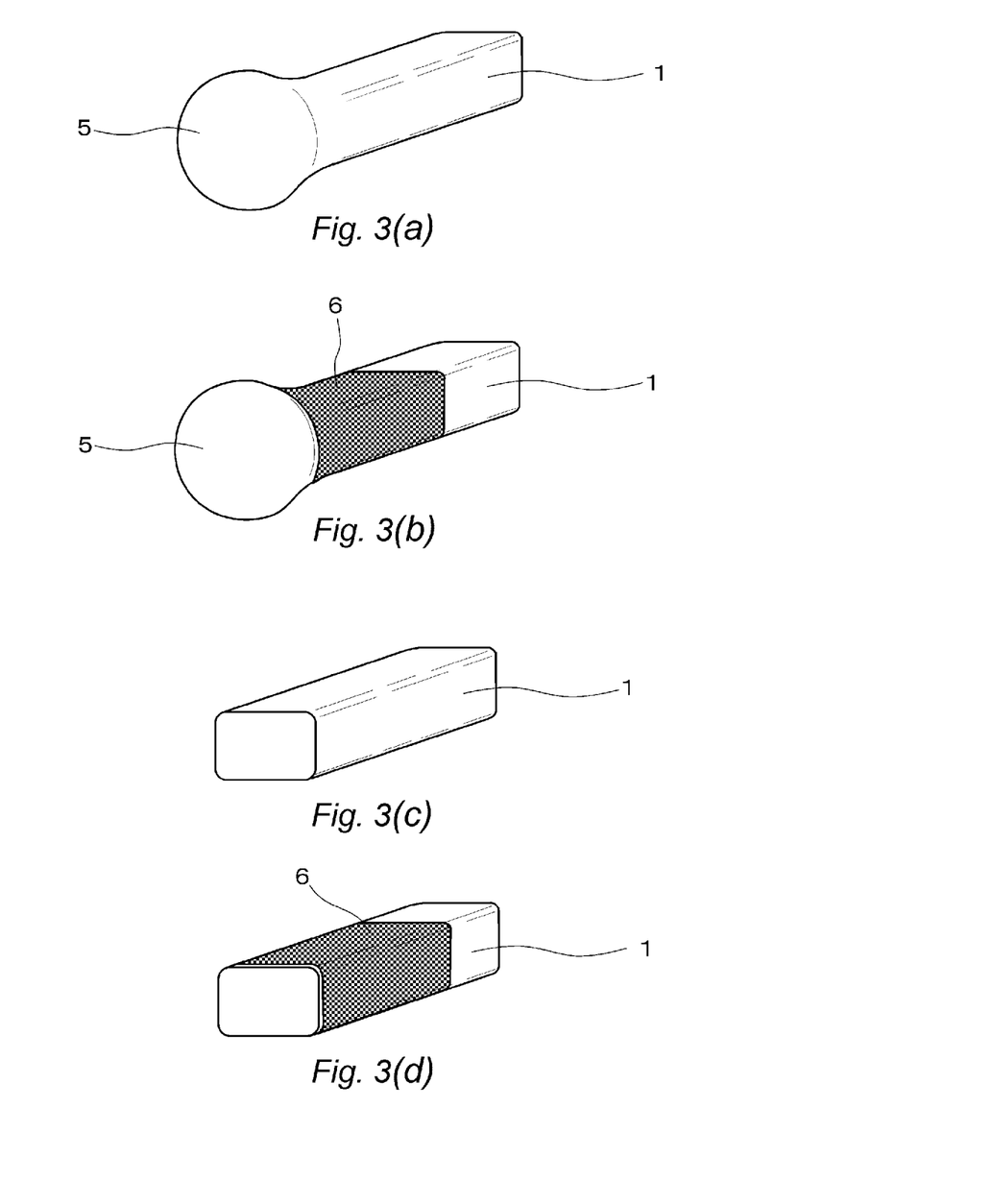
FIG. 3(a) is a perspective view showing an example which exhibits excellent welding property.
FIG. 3(b) is a perspective view showing an example in which the welding is possible.
FIG. 3(c) is a perspective view showing an example which provides a poor welding property.
FIG. 3(d) is a perspective view showing an example in which the welding became impossible.

The wire terminal was welded under the conditions of: welding current 30 A; and welding time 0.1 seconds, by generating arc discharge. When a welding ball arose at the wire terminal, the welding was judged as operable. On the other hand, when the welding ball did not arise but flowed, the welding was judged as inoperable. Further, when black soot generated on the periphery of the welded area, the welding was also judged as inoperable. That is:

As shown in FIG. 3(*a*), when there was no change in color on the periphery of the welded area of the rectangular wire 1 and also a welding ball 5 arose at the terminal of the rectangular wire 1, the welding was judged as being excellent and was rated as "A";

As shown in FIG. 3(*b*), although soot 6 generated on the periphery of the welded area of the rectangular wire 1, when a welding ball 5 arose at the terminal of the rectangular wire 1, the welding was judged as being good and was rated as "B";

As shown in FIG. 3(*c*), when there was no change in color on the periphery of the welded area of the rectangular wire 1, but no welding ball 5 did arise at the terminal of the rectangular wire 1, the welding was judged as being poor and was rated as "C"; and As shown in FIG. 3(*d*), when soot 6 generated on the periphery of the welded area of the rectangular wire 1 and no welding ball 5 did arise at the terminal of the rectangular wire 1, the welding was judged as being inoperable and was rated as "D".

The acceptance criterion is "A" and "B" judgments.

Note that the "the periphery of the welded area" means a range of about 5 mm in the line direction from the welded terminal.

(High-Frequency Property)

Under the conditions of 1,000 Hz, 2.16 A and 138 Vrms, an AC magnetic field generator was put into operation, thereby generating AC magnetic field of 50 mT. When a sample is set in the magnetic field, heat generation due to eddy current is caused. The amount of heat generation at this time was measured and was defines as a current loss (W). A current loss $W_0$ of the rectangular wire in which a polyetheretherketone resin was extrusion-coated on a non-multilayered conductor was calculated as described above.

When the ratio of current losses W and $W_0$ of each sample was 0.8 or less (inhibition ratio of the current loss is 20% or more), high-frequency property was judged as being good and rated as "B". Further, when the ratio is 0.4 or less (inhibition ratio of the current loss is 60% or more), high-frequency property was judged as being excellent and rated as "A". On the other hand, when the ratio is more than 0.8 (inhibition ratio of the current loss is less than 20%), high-frequency property was judged as being poor and rated as "D".

$P = EI \cos \phi$ In this regard, $\phi = \tan^{-1}(Ls \cdot 2\pi f/Rs)$

E (V): Measured value of input voltage
Ls (H): Measured value of inductance
I (A): Measured value of input current
Rs (Ω): Measured value of resistance (Molding Property)

Figure 4A:
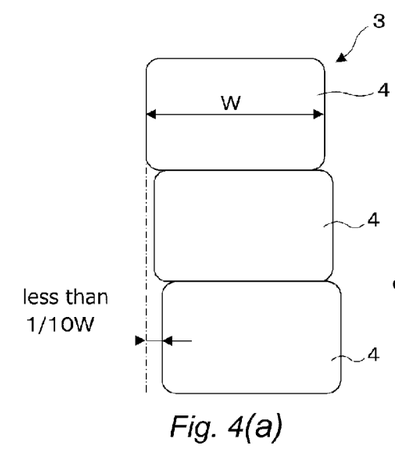
FIG. 4(a) is a cross-section view showing an example which exhibits excellent molding property.
Figure 4B:
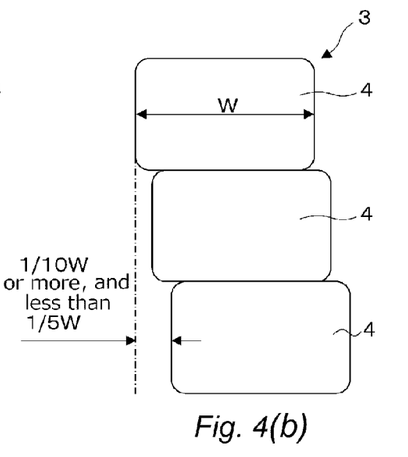
FIG. 4(b) is a cross-section view showing an example which exhibits a good molding property.
Figure 4C:
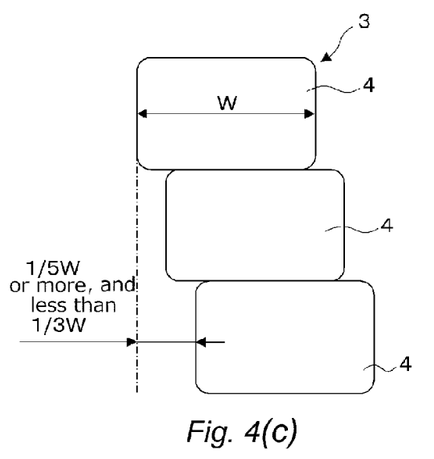
FIG. 4(c) is a cross-section view showing an example in which the molding property is in an acceptable range.
Figure 4D:
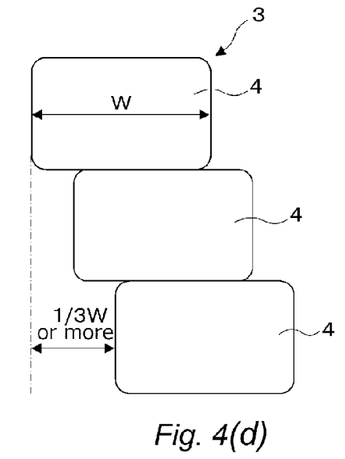
FIG. 4(d) is a cross-section view showing an example which provides a poor molding property.

With regard to the rectangular wire formed by extrusion-coating a second thermoplastic resin on the multilayer conductor member, the cross-section thereof was cut and observed. At this time, the cross-section was checked for a tilt and a misalignment of the multilayer. With regard to the tilt, whether the angle to the direction of the multilayer to be stacked is nothing was checked. Further, with regard to the misalignment, in the case of the multilayer to be stacked in the thickness direction, whether a misalignment of ⅓ or more of the length of width is nothing was checked, with respect to not only conductors adjacent to each other but also conductors in which a misalignment between them is largest. When such a tilt and misalignment were less than ⅓ of the length of width, the molding property was judged as being in an acceptable range and was rated as "A", "B", and "C". On the other hand, when such a tilt and misalignment existed, the molding property was judged as being poor and was rated as "D". That is:

As shown in FIG. 4(a), when the rectangular basic wire 4 constituting the multilayer conductor member 3 was stacked in the thickness direction, and the misalignment in the width direction of the rectangular basic wire 4 having the largest misalignment was the length of less than 1/10 of the width W, the molding property was judged as being excellent and was rated as "A";

As shown in FIG. 4(b), when the rectangular basic wire 4 constituting the multilayer conductor member 3 was stacked in the thickness direction, and the misalignment in the width direction of the rectangular basic wire 4 having the largest misalignment was the length of 1/10 or more and less than 1/5 of the width W, the molding property was judged as being good and was rated as "B";

As shown in FIG. 4(c), when the rectangular basic wire 4 constituting the multilayer conductor member 3 was stacked in the thickness direction, and the misalignment in the width direction of the rectangular basic wire 4 having the largest misalignment was the length of 1/5 or more and less than 1/3 of the width W, the molding property was judged as being in an acceptable range and was rated as "C"; and As shown in FIG. 4(d), when the rectangular basic wire 4 constituting the multilayer conductor member 3 was stacked in the thickness direction, and the misalignment in the width direction of the rectangular basic wire 4 having the largest misalignment was the length of 1/3 or more of the width W, the molding property was judged as being poor and was rated as "D".

The acceptance criterion is "A", "B" and "C" judgments.

TABLE 2

| | | Ex 1 | Ex 2 | Ex 3 | Ex 4 | Ex 5 | Ex 6 | Ex 7 | Ex 8 | Ex 9 |
|---|---|---|---|---|---|---|---|---|---|---|
| Metallic conductor | Kind | Cu | Cu | Cu | Cu | Cu | Cu | Cu | Cu | Cu |
| | The number of stacked layers | 2 | 2 | 6 | 2 | 2 | 2 | 2 | 6 | 2 |
| The layer of 1st theromoplastic resin | Kind | PEI | PEI | PEI | PEI | PEI | PEI | PES | PES | PPSU |
| | Thickness of coating (μm) | 0.5 | 1 | 3 | 3 | 25 | 40 | 3 | 4 | 3 |
| The layer of 2nd theromoplastic resin | Kind | PEEK | PEEK | PEEK | PEEK | PEEK | PEEK | PEEK | PEEK | PEEK |
| | Thickness of coating (μm) | 115 | 110 | 108 | 45 | 110 | 108 | 105 | 110 | 108 |
| Welding property | | A | A | A | A | B | B | A | A | A |
| High-frequency property | | B | B | A | B | B | B | B | A | B |
| Molding property | | B | B | B | B | B | B | B | B | B |

Note:
'Ex' means Example (the same will be applied below.)

| | | Ex 10 | Ex 11 | Ex 12 | Ex 13 | Ex 14 | Ex 15 | Ex 16 | Ex 17 |
|---|---|---|---|---|---|---|---|---|---|
| Metallic conductor | Kind | Cu | Cu | Cu | Cu | Cu | Cu | Cu | Cu |
| | The number of stacked layers | 2 | 2 | 6 | 2 | 2 | 2 | 2 | 6 |
| The layer of 1st theromoplastic resin | Kind | PA66 | PA66 | PA66 | PA66 | PA66 | PA66 | PA66 | PA66 |
| | Thickness of coating (μm) | 0.5 | 1 | 4 | 3 | 15 | 50 | 2 | 3 |
| The layer of 2nd theromoplastic resin | Kind | PEEK | PEEK | PEEK | PEEK | PEEK | PEEK | modified-PEEK | modified-PEEK |
| | Thickness of coating (μm) | 112 | 110 | 110 | 42 | 108 | 110 | 108 | 110 |
| Welding property | | A | A | A | A | A | A | A | A |
| High-frequency property | | B | B | A | B | B | B | B | A |
| Molding property | | B | B | B | B | B | B | B | B |

| | | Ex 18 | Ex 19 | Ex 20 | Ex 21 | Ex 22 | Ex 23 | Ex 24 | Ex 25 |
|---|---|---|---|---|---|---|---|---|---|
| Metallic conductor | Kind | Cu | Cu | Cu | Cu | Cu | Cu | Cu | Cu |
| | The number of stacked layers | 2 | 2 | 6 | 6 | 2 + 2 | 2 + 2 | 2 | 6 |
| The layer of 1st theromoplastic resin | Kind | PA66 | PA66 | PA66 | PA66 | PA66 | PA66 | PA66 | PA66 |
| | Thickness of coating (μm) | 2 | 1 | 4 | 4 | 3 | 4 | 3 (on one side) | 3 (on one side) |
| The layer of 2nd theromoplastic resin | Kind | PEEK | PEEK | PEEK | PEEK | PEEK | PEEK | PEEK | PEEK |
| | Thickness of coating (μm) | 147 | 184 | 152 | 185 | 51 | 180 | 42 | 152 |
| Welding property | | A | A | A | A | A | A | A | A |
| High-frequency property | | B | B | A | A | B | B | B | A |
| Molding property | | B | B | B | B | B | B | B | B |

| | | CEx 1 | CEx 2 | CEx 3 | CEx 4 | CEx 5 |
|---|---|---|---|---|---|---|
| Metallic conductor | Kind | Cu | Cu | Cu | Cu | Cu |
| | The number of stacked layers | 2 | 2 | 2 | 7 | 2 |
| The layer of 1st theromoplastic resin | Kind | PAI | PI | None | PA66 | PA66 |
| | Thickness of coating (μm) | 4 | 3 | — | 3 | 55 |

TABLE 2-continued

| The layer of 2nd theromoplastic resin | Kind | PEEK | PEEK | PEEK | PEEK | PEEK |
|---|---|---|---|---|---|---|
| | Thickness of coating (μm) | 105 | 110 | 110 | 115 | 110 |
| Welding property | | D | D | A | A | A |
| High-frequency property | | B | B | D | A | B |
| Molding property | | B | B | B | D | D |

Note:
'CEx' means Comparative Example

As shown in Table 2, it was found that in each of Examples 1 to 25, each of the welding property and the high-frequency property are excellent, and that further excellent anti-heat aging property can be maintained over a long period of time. In those Examples 1 to 25, the layer of the first thermoplastic resin on the outer periphery of the metallic conductor was composed of: a non-crystalline resin having no melting point; or a crystalline resin having an amide bond, and the thickness thereof was 0.5 μm or more and 50 μm or less. Further, the layer of the second thermoplastic resin on the outer periphery of the multilayer conductor member had a film constitution formed by a thermoplastic resin having a melting point of 300° C. or more, and the thickness thereof of 40 μm or more and 200 μm or less.

In contrast, from Comparative Example 3, a decrease in high-frequency loss was hardly anticipated without any layer on the outer periphery of the metallic conductor. Further, from Comparative Examples 1 and 2, it was found that a welding property was not anticipated if the layer on the outer periphery of the metallic conductor was composed of a conventional resin, such as a polyamideimide, a polyimide, and the like. Further, from Comparative Example 4, when the number of multilayer was 7, the multilayer was badly constructed in the thickness direction. Further, from Comparative Example 5, when the thickness of the layer on the outer periphery of the metallic conductor was 55 μm, it was also difficult to construct the multilayer.

Further, in Examples 10 to 25, even when a polyamide 46 or a polyamide 6 was used for the first thermoplastic resin in place of the polyamide 66, evaluation results similar to those obtained by using the polyamide 66 were obtained.

Furthermore, it was also confirmed that each of the insulation wires of Examples 1 to 25 and Comparative Examples 1 to 5 satisfied the abrasion resistance and solvent resistance.

Having described our invention as related to the present embodiments together with the examples, it is our intention that the invention not be limited by any of the details of the description, unless otherwise specified, but rather be construed broadly within its spirit and scope as set out in the accompanying claims.

REFERENCE SIGNS LIST

1 Rectangular wire
2 Rectangular metallic conductor (Metallic conductor)
3 Multilayer conductor member
11 Layer of first thermoplastic resin
21 Layer of second thermoplastic resin

The invention claimed is:
1. A rectangular wire having:
a stacked multilayer conductor member comprising, in a thickness direction, a rectangular metallic conductor that has a layer of a first thermoplastic resin formed on the outer periphery thereof, the first thermoplastic resin being a non-crystalline resin having no melting point or a crystalline resin having an amide bond,
wherein a total number of stacked rectangular metallic conductors in the thickness direction is 6,
wherein the first thermoplastic resin is coated in a thickness of 3 to 4 μm only on one side in a width direction of the rectangular metallic conductor; and
a layer of a second thermoplastic resin having a melting point of 300° C. or more to 450° C. or less only on the outer periphery of the multilayer conductor member,
wherein the second thermoplastic resin has a thickness of 40 to 200 μm; and
the rectangular wire exhibits a high-frequency property having a ratio of current loss that is 0.8 or less at a frequency of 1,000 Hz.

2. The rectangular wire as claimed in claim 1, wherein the first thermoplastic resin is a resin selected from the group consisting of a polyetherimide, a polyphenylsulfone, a polyethersulfone, a polyamide 66, a polyamide 46, and a polyamide 6.

3. The rectangular wire as claimed in claim 1, wherein the second thermoplastic resin is a resin selected from the group consisting of a polyaryletherketone, a modified poletheretherketone, and a thermoplastic polyimide.

4. A method of producing a rectangular wire comprising:
a step of forming a multilayer conductor member by stacking, in a thickness direction, a rectangular metallic conductor having formed by bake-coating a layer of a first thermoplastic resin on the outer periphery thereof, the first thermoplastic resin being a non-crystalline resin having no melting point or a crystalline resin having an amide bond,
wherein a total number of stacked rectangular metallic conductors in the thickness direction is 6,
wherein the first thermoplastic resin is coated in a thickness of 3 to 4 μm only on one side in a width direction of the rectangular metallic conductor; and
a step of coating a layer of a second thermoplastic resin having a melting point of 300° C. or more to 450° C. or less only on the outer periphery of the multilayer conductor member,
wherein the second thermoplastic resin has a thickness of 40 to 200 μm; and
the rectangular wire exhibits a high-frequency property having a ratio of current loss that is 0.8 or less at a frequency of 1,000 Hz.

5. An electrical equipment comprising a rectangular wire having:
a stacked multilayer conductor member comprising, in a thickness direction, a rectangular metallic conductor having a layer of a first thermoplastic resin formed on the outer periphery thereof, the first thermoplastic resin being a non-crystalline resin having no melting point or a crystalline resin having an amide bond,
wherein a total number of stacked rectangular metallic conductors in the thickness direction is 6, wherein the first thermoplastic resin is coated in a thickness of 3 to 4 μm only on one side in a width direction of the rectangular metallic conductor; and a layer of a second thermoplastic resin having a melting point of 300° C. or more to 450° C. or less only on the outer periphery of the multilayer conductor member, wherein the second thermoplastic resin has a thickness of 40 to 200 μm; and the rectangular wire exhibits a high-frequency property having a ratio of current loss that is 0.8 or less at a frequency of 1,000 Hz.

* * * * *